RELAY RELEASE MONITOR

Filed Feb. 7, 1966

INVENTOR.
JOHANNES DRAAYER

BY Glenn H. Antrim

AGENT

United States Patent Office 3,414,776
Patented Dec. 3, 1968

3,414,776

RELAY RELEASE MONITOR

Johannes Draayer, Wheaton, Ill., assignor to Automatic Electric Laboratories, Inc., Northlake, Ill., a corporation of Delaware Filed Feb. 7, 1966, Ser. No. 525,585
6 Claims. (Cl. 317—123)

ABSTRACT OF THE DISCLOSURE

A monitoring circuit is connected to windings of all relays in a group in which the relays are controlled one at a time by a fast operating, electronic, common control circuit. The monitoring circuit includes a Zener diode and a transistor switch connected between the windings and an in-process control input of the common control circuit. In response to release of a relay by operation of the much faster operating control circuit, the monitoring circuit senses the collapsing field of the relay which is being released to prevent the common control circuit from actuating any of the relays until contacts of this last-operated relay are completely open.

Figure 1:
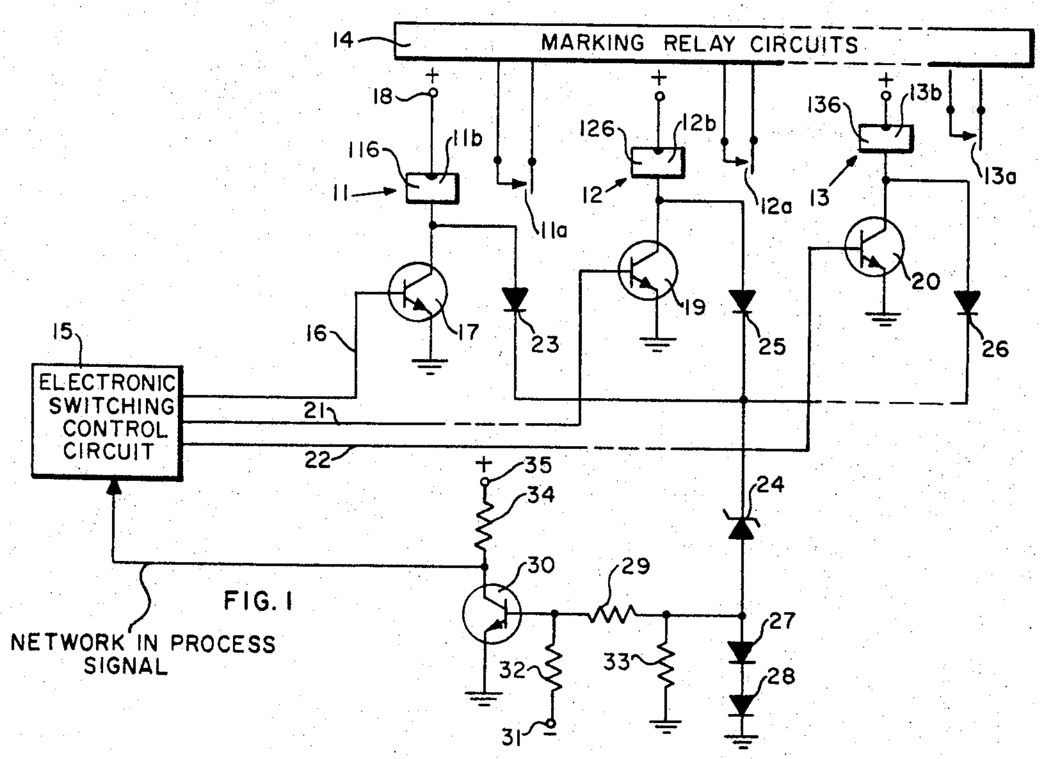

This invention pertains to circuits for monitoring release of electromagnetic relays.

In electronically controlled circuits for operating relays in a switching system, commands for operating relays are to be given successively as rapidly as possible in order to provide most economical use of the system. To prevent interfering connections when a single electronic switching control circuit controls operation of a plurality of relays, e.g. all relays in a large group, a new command signal for operating selected relays must not become effective until all relays have released in response to a preceding command for release of these relays. The delay should be only as long as required for allowing contacts of relays that are being released to become completely open.

For example, in electronic telephone exchange circuits, a single electronic control circuit, a computer, controls operation of all marking relays that operate to complete selected circuits for operating other relays in a crosspoint switching network. These relays in a crosspoint switching network operate to interconnect selected lines and trunks. Although the selected relays in the crosspoint switching network are held operated for the duration of a call, the marking relays are released immediately to be available for completing another call.

While any relays are releasing, a network-in-process signal is applied to the electronic switching control circuit to prevent it from operating relays. The network-in-process signals may be developed in various ways. For example, the contacts of the relays might be monitored directly; for instance, contacts of the relays could be included in a chain circuit for supervising the release of all relays. However, such a system is unduly complex, especially where the system has many relays. Alternately, a fixed delay interval can be provided in response to a command for releasing any relay. When a fixed delay is provided, the delay must be sufficient for the slowest releasing relay of a group to release completely. Since the delay that is required varies with operating conditions, either the circuit for providing the delay must be variable or it must be fixed for the longest delay that is required for the most adverse condition. A delay longer than required would obviously cause the system to have lower capacity than normally desirable.

According to the embodiment of the invention described herein, every relay of a group has a winding connected through a respective diode to a common terminal that is connected to a common Zener or breakdown diode. The collapse of the magnetic field of any relay or of any combination of relays that are being released, develops sufficient voltage to cause the breakdown diode to conduct current. A constant voltage developed by current flowing through the Zener diode is applied to a transistor switch to cause its operation, and the switch while operated applies a network-in-process control voltage to the computer.

By using the usual windings of the relays for providing delay, a minimum number of additional conventional parts are required. The delay that is provided after the operating circuits of relays are opened is only slightly longer than the time required for the contacts of the slowest releasing relay of a combination that is being released to open and to stop vibrating. The circuit automatically compensates for differences in characteristics of different types of relays that may be connected to the monitoring circuit and for different rates of release caused by variation in temperature.

An object of this invention is to provide a circuit with a minimum number of component parts for monitoring release of a plurality of relays.

Another object is to provide a monitoring output signal with duration proportional to release time as determined by the inductive and resistive characteristics of relay windings.

The objects, the following description, and the appended claims can be more readily understood with reference to the accompanying drawing in which:

FIG. 1 is a schematic diagram of the monitoring circuit of this invention applied to a conventional relay driver circuit; and FIGS. 2*a*–2*e* are curves on a common time base to show output of the network-in-process switch relative to an operating cycle of a relay switching circuit.

In FIG. 1, relays 11, 12, and 13 represent a required number of relays in a group that are operated in desired combinations to close normally open contacts according to connections that are to be completed in marking relay circuits 14. In electronic telephone circuits, these marking relay circuits 14 may represent relays that control crosspoint switching for interconnecting lines and trunks. When the relays are operated, marking circuits are completed by contacts 11*a*, 12*a* and 13*a* of relays 11, 12 and 13 respectively. The relays operate in selected combinations according to commands from an electronic switching control circuit 15. When a relay, for example relay 11, is to be operated, the control circuit 15 applies a change of bias to control conductor 16 that is connected to the input of an electronic switch 17. In this embodiment, the switch 17 is a type NPN transistor and the conductor 16 is connected to its base. The operating circuit for relay 11 extends from a positive terminal 18 through the winding 11*b* of the relay 11, the collector-emitter circuit of the transistor 17 to ground and through a source of voltage back to the terminal 18. The transistors 19 and 20 are connected in similar circuits for operating relays 12 and 13 respectively. Each of the relays 17, 19, and 20 operates in response to the application of positive voltage to control conductors 16, 21, and 22 respectively.

The monitor circuit is connected through respective diodes 23, 25 and 26 to all relays 11, 12, and 13 that represent any group of relays that are successively accessible for completing different connections in the marking relay circuits 14. That terminal of the relay winding 11*b* of relay 11 which is connected to its electronic switch 17 is connected through a unidirectional diode 23 to a terminal of a Zener diode 24. Likewise, the terminals of the relay windings 12*b* and 13*b* that are connected to the respective switches 19 and 20, are connected through respective diodes 25 and 26 to the same terminal of the Zener diode 24.

The other terminal of the Zener diode 24 is connected through series diodes 27 and 28 to ground potential, and the junction of the Zener diode 24 and the diode 27 is connected through a bias resistor 29 to the input of the transistor inhibit switch 30. The Zener diode 24 and the diodes 27 and 28 determine a constant voltage threshold. When self-induced voltage of any relay winding 11*b*, 12*b*, or 13*b* exceeds the threshold voltage, current flows in the respective winding. In order that relays 11, 12 and 13 release quickly, the voltage across the series diodes 24, 27, and 28 is to be as high as permissible and still provide certain protection for the switching transistors 17, 19, and 20. The voltage drop across the diodes 27 and 28 is a suitable value for operating a type NPN transistor 30 that functions as a switch for applying network-in-process or inhibit signal to the electronic switching control circuit 15. Alternately, an additional Zener diode may be substituted for the diodes 27 and 28.

A usual bias circuit for the base of the transistor 30 extends from a negative terminal 31, through resistor 32 to the base of the transistor 30, and from the base through resistors 29 and 33 to ground. The emitter of the transistor 30 is connected to ground and the collector of the transistor is connected to an output circuit and also through a load resistor 34 to a positive terminal 35.

Figures 2A, 2B, 2C, 2D, 2E:
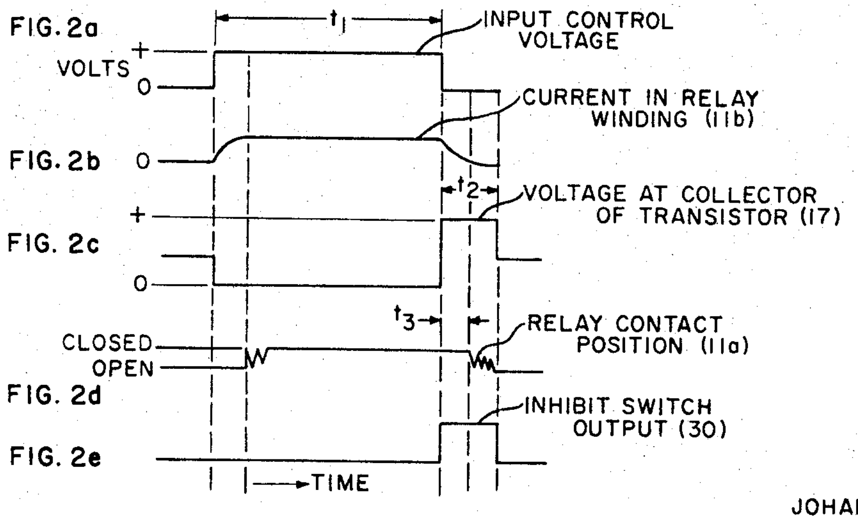

The operation of the relay monitor circuit of this invention may be understood by referring to the curves of FIGS. 2*a*–2*e* while reading the following description of the operation of relay 11 of FIG. 1. A positive bias as shown in FIG. 2*a* is applied for an interval $t_1$ to the base of the transistor 17. The transistor 17 that is normally nonconductive, becomes conductive to cause current according to the curve of FIG. 2*b* to flow through the winding 11*b*. The voltage measured from ground to the junction of the collector of the transistor 17 and the winding 11*b* is shown in FIG. 2*c*. During the interval $t_1$, the voltage on the collector is nearly zero, and almost the full voltage that is applied to terminal 18 is applied across the winding 11*b*. At the end of time $t_1$ when the transistor switch 17 opens, the voltage that results from self-induction in the winding 11*b* rises rapidly as shown in FIG. 2*c* until the breakdown diode 24 becomes conductive. The current through the winding 11*b* and the diodes 23, 24, 27 and 28 decays during an interval $t_2$ as shown in FIG. 2*b*. The level of the constant voltage drop across the Zener diode 24 and the diodes 27 and 28 during the interval $t_2$ determines the rate of decay of the relay current and determines the release time of relay contacts 11*a*.

The relay contacts 11*a* close shortly after the transistor switch 17 becomes conductive as shown in FIG. 2*d* and remain closed until the relay current caused by induction decreases during an interval $t_3$ to the value at which the contacts open. After the contacts first open, reoperation must be delayed for an additional short interval until contact bounce has ceased. The voltage across the Zener diode 24 is maintained at the breakdown voltage of the diode for a short interval after the current through the relay winding 11*b* has decreased below the value at which contacts 11*a* open. As long as the current from the winding is sustained, a constant voltage that is developed across the diodes 27 and 28 supplies control voltage through the resistor 29 to the base of the transistor 30. In response to the application of control voltage to the base, the transistor 30 provides an output at its collector for an interval shown in FIG. 2*c*. By the time that the output ceases, the contacts 11*a* are completely open. The output signal is applied as input control information to electronic switching control circuits 15 to prevent application of positive control voltage to any of the transistors 17, 19, or 20 of a group until all contacts that are controlled by the group are completely open.

Although the monitor does not sense the actual states of operation of relay contacts, their times of operation are so dependent upon the change in magnetic fields of the associated windings that reliable timing for controlling sequences of operation is obtained. As described above, the duration of an output inhibit signal is automatically extended as required to permit opening of the contacts of the relay that requires the longest time to release. Specifically, when the resistance of a winding of the relay 11 decreases, both the interval $t_3$ (FIG. 2*d*), that is required for the induction current to decrease to the point at which relay contacts open, and the duration of the output voltage (FIG. 2*e*) are increased so that switching control circuits are inhibited for a period that is consistent with the interval required for release of the contacts 11*a*. The rate of the operation of the circuit is thereby changed to permit fast operation at all times dependent upon the present characteristic of the relays of a group.

In an electronic telephone system, all crosspoint relays and marking relays for a 5,000 line office are controlled by a single computer, and the releasing intervals of all relays may be monitored by a single network-in-process switch. Diodes, corresponding to diodes 23, 25, and 26, that are connected to the Zener diode 24 can be arranged in parallel and series arrangements as required.

The monitoring circuit of this invention may be applied to other systems that have magnetic cores that are to be monitored. For example, memory cores in a computer system can be monitored so that an erroneous change of state can be detected and an alarm sounded.

What is claimed is:

1. A monitoring circuit for detecting duration of rapid change in the intensity of magnetic fields in magnetic core devices comprising:

a plurality of cores, each of said cores having a winding,
a constant voltage device,
an isolating element for each of said windings,
said windings through their respective isolating elements being connected across said constant voltage device, and
detecting means connected to said constant voltage device to detect current flow in response to voltage developed across any of said windings exceeding voltage across said constant voltage device.

2. A monitoring circuit as claimed in claim 1 wherein said isolating elements are unidirectional diodes and said constant voltage device has a predetermined polarity, and
said detecting means providing an output control voltage for the duration of rapidly changing fields of any of said cores in response to voltage across any of said cores having said predetermined polarity and exceeding the voltage developed across said constant voltage device.

3. In a circuit having a plurality of magnetic cores,
a winding for each of said cores, and
means for changing abruptly the intensity of the magnetic fields of said cores in selected combinations,
a monitoring circuit for providing an output signal in response to an abrupt change in the intensity of the magnetic field of any of said cores comprising:
an electronic switch common to all of said cores,
a unidirectional diode for each of said cores, and
a breakdown diode common to all of said cores, said breakdown diode being connected in series with the input of said electronic switch,
each of said core windings being connected through a respective one of said unidirectional diodes to said breakdown diode for connecting all of said serially connected windings and respective diodes across said serially connected breakdown diode and said input of said electronic switch,
each of said unidirectional diodes being connected in the required sense for conducting current as a result of rapid collapsing of the magnetic field of a respective core, and said electronic switch operating in response to voltage greater than the breakdown voltage of said breakdown diode being developed across any of said windings.

4. In a system having a plurality of electromagnetic relays with respective winding means, and an electronic control circuit common to all of said relays, said relays being operated repeatedly in response to repeated closure of said winding means under control of said electronic control circuit, reoperation of said relays being prevented by disabling said electronic control circuits until all of said relays have released in response to opening said winding means incident to a preceding release command given by said electronic control circuit;

an arrangement for monitoring the release of said relays comprising a voltage detector and a plurality of isolating devices, the input of said voltage detector being connected through respective ones of said isolating devices to said winding means, the output of said detector being connected to said electronic control device, and said detector in response to relatively high inductive voltage developed across said winding means upon collapse of the magnetic fields of said relays in response to the opening of said winding means, producing an output potential to re-enable said control circuit for reclosing said winding means.

5. In a switching circuit having a plurality of relays, each of said relays having a magnetic core, a winding, and at least a set of contacts controlled by the magnetic field of said respective core;

a monitoring circuit for providing a control signal during the release period of any of said relays, said monitoring circuit having a unidirectional diode for each of said relays, a breakdown diode common to all of said relays, a voltage detecting circuit, each of said windings being connected through a respective one of said unidirectional diodes to said breakdown diode for connecting all of said serially connected windings and respective diodes across the input of said voltage detecting circuit, means for changing abruptly in a predetermined direction the intensity of magnetizations of said cores, each of said unidirectional diodes being connected in the required sense for conducting current as a result of said abrupt changes of magnetization in said predetermined direction, and said detecting circuit operating to produce an output voltage in response to voltage greater than the breakdown voltage of said breakdown diode being developed across any of said windings.

6. In a relay driving circuit having, a plurality of relays, each having an operating winding and at least a set of spring contacts, a control switch for each of said relays, each of said operating windings and a respective one of said control switches being connected in a series circuit, and means for applying operating voltage across each of said series circuits;

a monitoring circuit comprising:

a common electronic switch having an input and an output, an unidirectional diode for each of said relays, and a breakdown diode common to all of said relays, said breakdown diode being connected in series with the input of said electronic switch, each of said relay windings being connected through a respective one of said unidirectional diodes to said breakdown diode for connecting all of said serially connected relay windings and respective diodes across said serially connected breakdown diode and input of said common electronic switch, each of said unidirectional diodes being connected in the required sense for conducting current as a result of the collapsing of the magnetic field of a respective relay in response to the opening of a respective switch, and said common electronic switch providing a monitoring voltage at its output while voltage across any of said relay windings exceeds the breakdown voltage of said breakdown diode.

References Cited

UNITED STATES PATENTS

| | | | |
|---|---|---|---|
| 2,994,071 | 7/1961 | Olson et al. | |
| 3,139,562 | 6/1964 | Freeborn | 317—148.5 |
| 3,275,899 | 9/1966 | De Wolf | 317—148.5 |

LEE T. HIX, *Primary Examiner.*